Feb. 19, 1929.
W. G. HARDY
1,702,941
AUTOMOBILE BUMPER
Filed Dec. 27, 1927
4 Sheets-Sheet 2
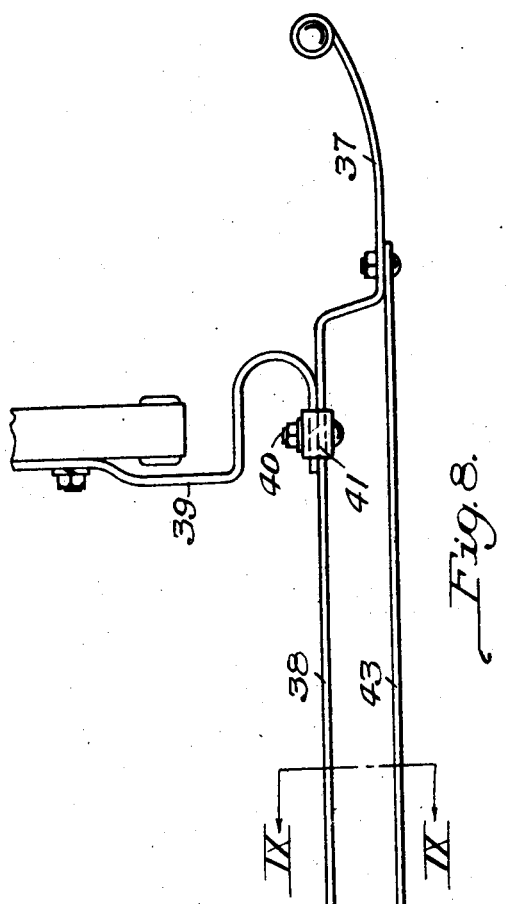
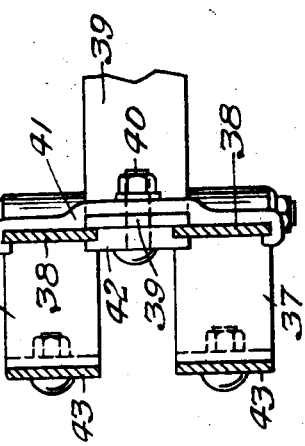
INVENTOR
William G. Hardy
By Archwith Martin,
Attorney Feb. 19, 1929.
W. G. HARDY
1,702,941
AUTOMOBILE BUMPER
Filed Dec. 27, 1927
4 Sheets-Sheet 3
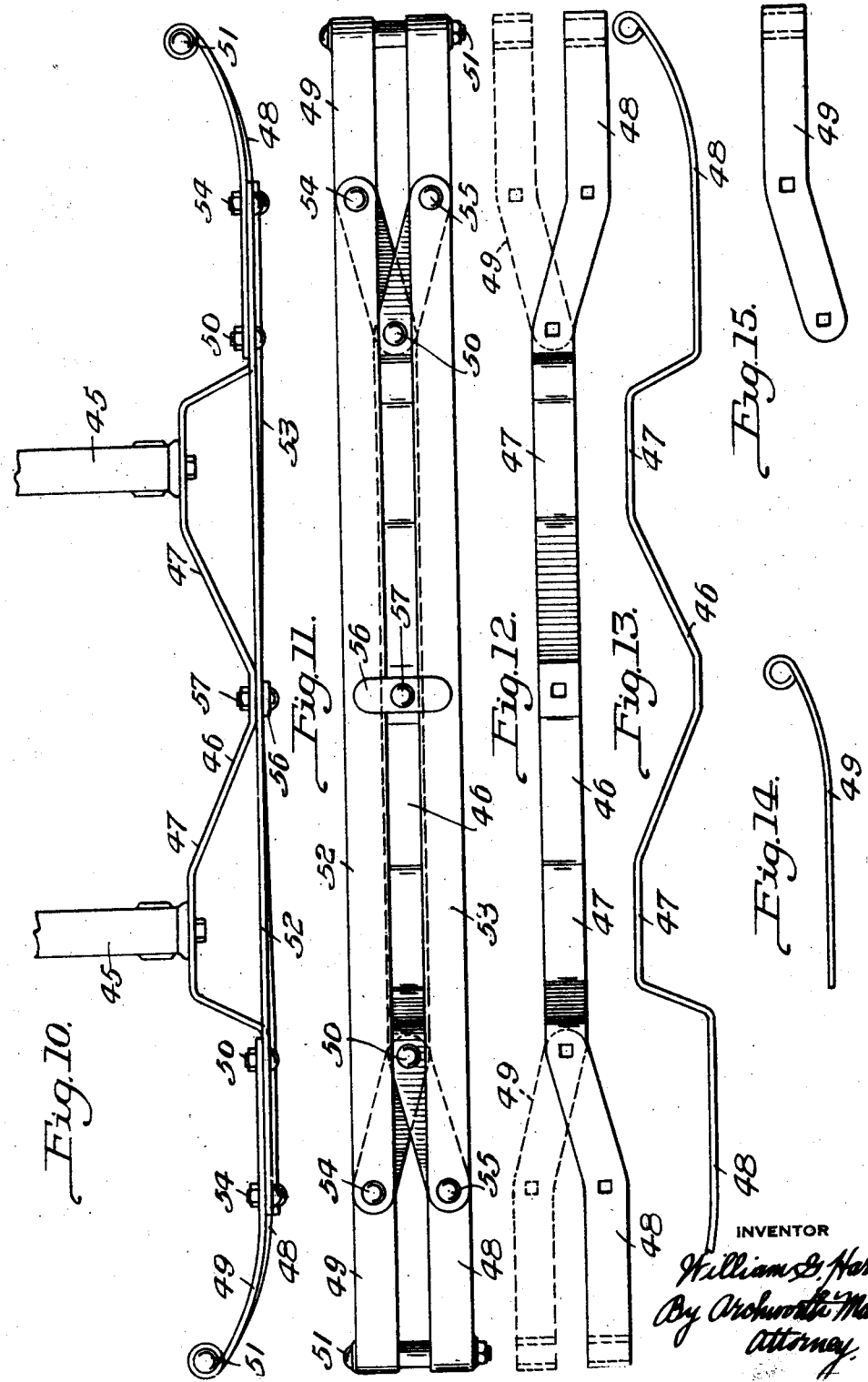
INVENTOR
William G. Hardy
By Ashworth Martin
Attorney

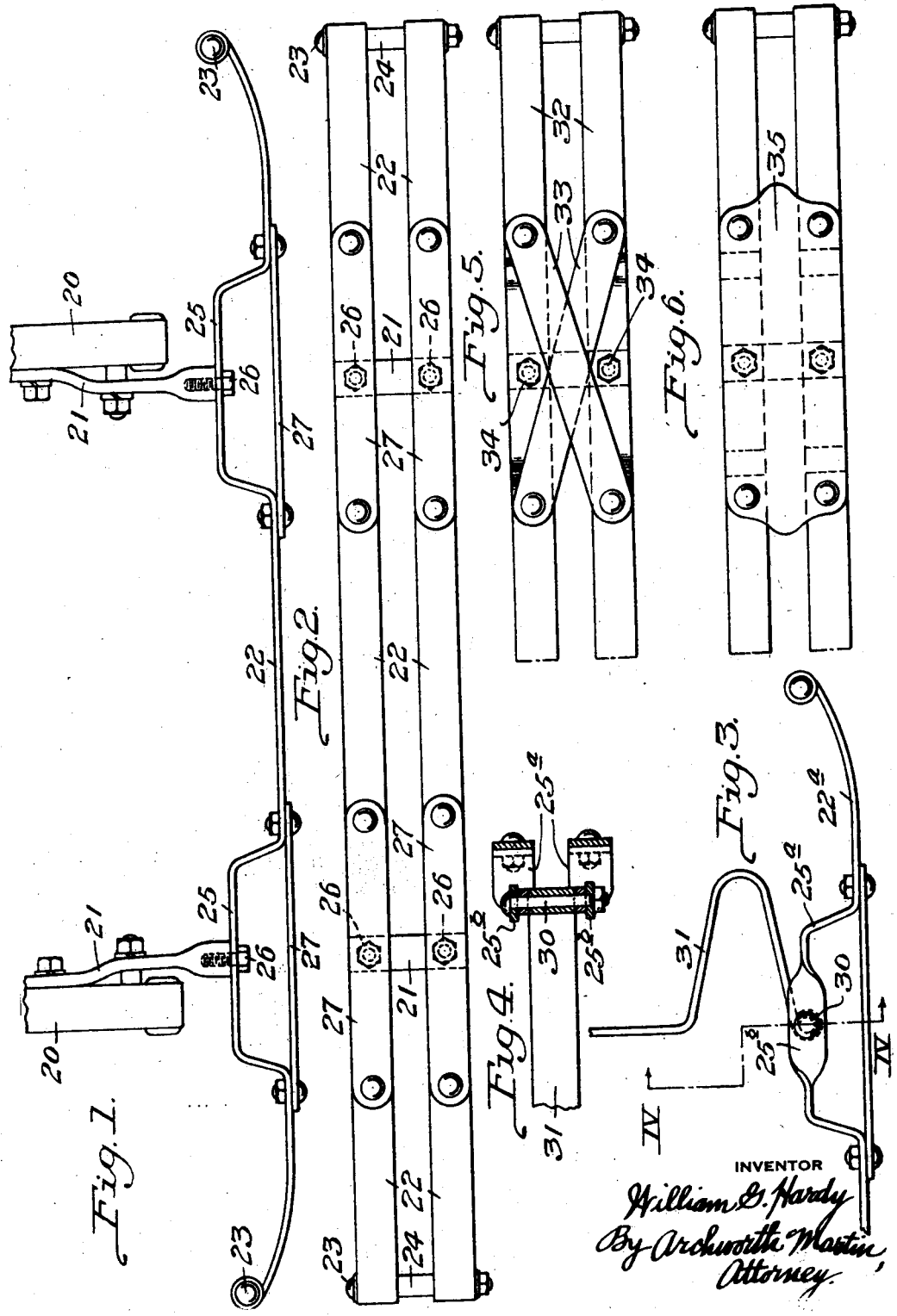

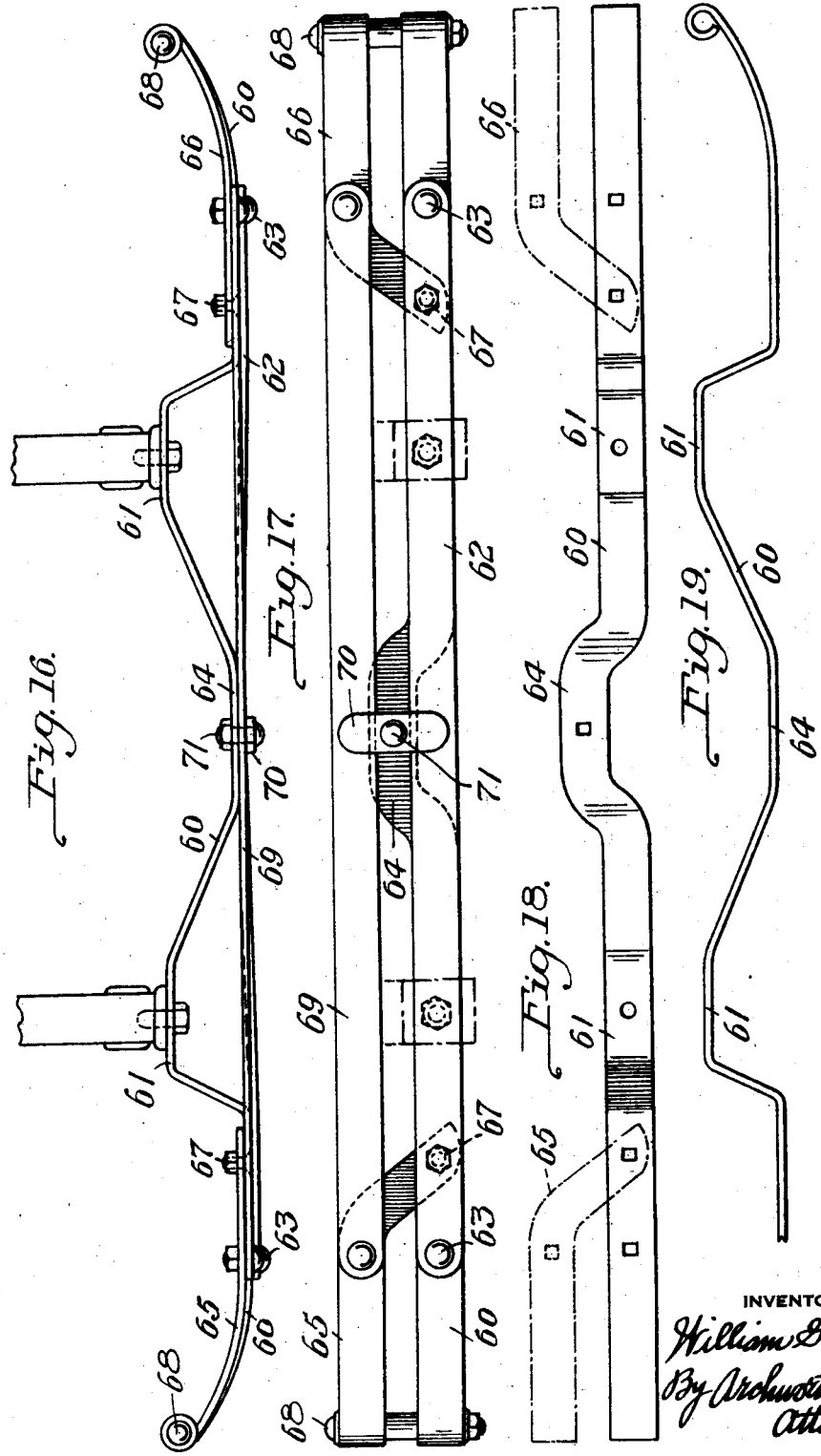

Patented Feb. 19, 1929.

1,702,941

UNITED STATES PATENT OFFICE.

WILLIAM G. HARDY, OF CRAFTON, PENNSYLVANIA, ASSIGNOR TO UNITED STATES CHAIN & FORGING COMPANY, OF PITTSBURGH, PENNSYLVANIA, A CORPORATION OF DELAWARE.

AUTOMOBILE BUMPER.

Application filed December 27, 1927. Serial No. 242,662.

My invention relates to automobile bumpers such as are employed for absorbing impacts of collisions at the front and rear ends of motor vehicles and the like.

My invention has for one of its objects the provision of a bumper structure wherein the main bumper member or impact bar has rearwardly-deflected portions intermediate its ends, of such form that the bar may be more conveniently attached to a vehicle frame, and with less expense than in the case of various types of bumper structures heretofore employed.

Another object of my invention is to provide a bumper structure wherein, not withstanding the fact that portions of the bar intermediate its ends are deflected rearwardly, the front or impact-receiving surface of the structure is substantially continuous and unbroken.

Another object of my invention is to provide an improved manner of attaching a bumper bar to a vehicle frame.

Still another object of my invention is to simplify and improve bumper structures generally.

Some of the various forms which my invention may take are shown in the accompanying drawings wherein Figure 1 is a plan view of a bumper bar structure embodying my invention; Fig. 2 is a front elevational view thereof; Fig. 3 shows a fragmentary plan view of another form of bumper structure; Fig. 4 is a view taken on the line IV—IV of Fig. 3; Fig. 5 is a front elevational view of a modification of the structure of Fig. 2; Fig. 6 is a still further modification of such structure; Fig. 7 is a plan view of still another form of bumper structure; Fig. 8 is a front elevational view of the structure of Fig. 7; Fig. 9 is a view taken on the line IX—IX of Fig. 7; Fig. 10 is a plan view of still another form of bumper embodying my invention; Fig. 11 is a front elevational view of the device of Fig. 10; Fig. 12 is a front elevational view of a portion of the structure of Fig. 11; Fig. 13 is a plan view of a portion of the structure of Fig. 12; Fig. 14 is a plan view of still another portion thereof; Fig. 15 is an elevational view of the member of Fig. 14; Fig. 16 is a plan view showing a modification of the structure of Fig. 10; Fig. 17 is a front elevational view thereof; Fig. 18 is a fragmentary view with certain of the parts of Fig. 17 omitted and Fig. 19 is a plan view of a portion of one of the bars of Fig. 18.

Referring now to Figs. 1 and 2, the usual side frames of a motor vehicle are represented by the numerals 20. Bracket arms 21 are bolted to said side frames and the outer ends thereof extend vertically for some distance as shown in Fig. 2. The bumper structure proper is of that class known as the "twin bar" type, involving upper and lower impact-receiving bars 22 that are bent at their outer ends to form eyes through which tie bolts 23 extend for the purpose of holding such ends in alinement and in assembled relation. Spacing washers or collars 24 are provided for maintaining proper spacing between the outer ends of the bars, the bolts 23 extending through such collars 24.

The bars 22 each have two rearwardly deflected portions 25 that are connected to the bracket arms 21 by means of bolts 26. The bars are thus directly connected to the supporting arms, and are nevertheless disposed at a desired distance forwardly of the vehicle frame, without excessive lengthening of the bracket arms.

Furthermore, the deflected portions 25 yield under impacts, since the bars themselves are of spring steel, thus producing an additional yielding effect in the bumper structure, without the necessity of employing additional loops or providing what are termed "back bar" members in addition to the usual impact-receiving bars or front bars corresponding to the bars 22.

Bridging plates 27, preferably of spring steel, and which may be of a color contrasting to that of the impact bars 22, to add a decorative effect to the structure, are bolted or riveted to the impact bars 22, and to the front of the bends 25, so that a substantially continuous impact surface is provided, notwithstanding the rearward deflections of such bars.

It will be seen that if a single impact bar is desired, instead of twin bars, one of the bars 22 may be dispensed with, and that three or more bars corresponding to the bars 22 may be provided, if desired.

Referring now to Figs. 3 and 4, I show a structure wherein bars 22ª are provided that correspond to the bars 22, but wherein the deflected portions 25ª thereof are given a quarter turn at their mid portions 25ᵇ, so that a pivot bolt 30 may be supported in such portions 25ᵇ. A bracket arm 31, preferably of spring steel, has an eye portion formed at its forward end for the reception of the pivot bolt 30, this eye portion lying between the upper and lower bends 25ᵇ, as shown in Fig. 4. The bracket arms 31 will be employed in lieu of the bracket arms 21 and their rear ends may be suitably attached to the frame of a motor vehicle.

In Fig. 5, the impact bars 32 may be of substantially the same form as the bars 22 of Figs. 1 and 2, but the bridging plates 33 instead of extending horizontally, as in the case of the plates 27, are disposed diagonally, thus not only presenting different decorative appearance, but permitting of more convenient access to the attaching screws or bolts 34 that correspond to the screws 26 of Figs. 1 and 2.

The structure of Fig. 6 distinguishes from the devices of the other figures principally in the provision of a single bridging plate 35 near each end of the bumper structure, instead of a pair of bridging plates, thereby producing still another decorative design and increasing the strength of the bars adjacent to its point of connection to the supporting structure.

Referring to Figs. 7, 8 and 9, I show a pair of impact-receiving bars 37 each of which has a single long rearwardly deflected portion 38 instead of a pair of deflected portions such as 25 of Fig. 1. These deflected portions are connected to bracket arms 39 by means of bolts 40, clamping plates 41 and spacing and clamping blocks 42. The depressions formed by the deflected portions 38 are bridged by plates 43 that serve, as in the case of the plates 27 of Fig. 2, to assist in presenting an unbroken impact-receiving surface, and to lend a pleasing appearance to the structure, where they are of a color contrasting with that of the main bars 37.

Referring now to Figs. 10 to 15, I show a bumper bar structure, having the appearance of those of the twin bar type, wherein but one of the impact-receiving members is deflected rearwardly for attachment to vehicle frame members 45. This member 46 which I will term the main bar, has two rearwardly deflected portions 47 and has its ends 48 offset downwardly as shown more clearly in Fig. 12. A supplementary impact bar 49 is provided at each end of the main bar 46 and is bolted thereto by means of a horizontally-extending bolt 50 and a bolt 51 that extends through eyes formed in the outer ends of the bars 46 and 49, to tie such parts firmly together. Bridging plates 52 and 53 are secured to the bars 49 and 46 respectively by means of bolts or rivets 54 and 55. A clamping plate 56 and a bolt 57 are provided at the mid portion of the structure, for alining and connecting the mid portions of the plates 52 and 53 and the bar 46.

In Figs. 16 to 19, I show a structure that bears a general resemblance to that of Figs. 10 to 15, in that while a single main impact-receiving bar 60 is provided, a twin bar effect is produced by the addition of supplemental impact-receiving plates or bars. The bar 60 has portions 61 thereof deflected rearwardly for attachment to the ends of motor vehicle frames or other supporting devices. A plate or bar 62 serves to bridge the offset portions 61, such bar being connected at its ends by bolts 63 to the bar 60.

The bar 60 has its mid portion offset vertically, as indicated at 64. Supplementary impact-receiving bars 65 and 66 are connected to the ends of the bar 60 by means of bolts 67 and 68, the bars 65 and 66 being bent as shown more clearly by the dotted lines in Fig. 18 and the space between the points of bend being bridged by a plate 69 that serves as an impact-receiving member. The offset portion 64 is preferably of greater width than the space between adjacent edges of the plates 62 and 69, so that it will serve as a clamping member that co-operates with a clamping plate 70 and a bolt 71 for tying the mid portions of the bars 60, 62 and 69 together, the mid portion 64 serving also to yieldably brace the plates 62 and 69 at their mid portions.

It will be understood that the means by which certain of the above-described structures are connected to the vehicle frame may be employed for connecting various of the other forms to such frame, and that various other forms of bridging plates may be employed, and in fact some of the plates dispensed with where the rearward deflections are sufficiently shallow or of not very great extent longitudinally of the impact bars.

I claim as my invention:—

1. Bumper structure comprising an impact bar having rearwardly offset portions intermediate its ends, and means for connecting said portions to a supporting structure.

2. Bumper structure comprising an impact bar having rearwardly offset portions intermediate its ends, means for connecting said portions to a supporting structure, and plate members for bridging said offset portions.

3. Bumper structure comprising an impact bar having a rearwardly deflected portion of partially loop form intermediate its ends, to serve as a means of attachment of a bar to the support, and a plate for bridging said offset portion.

4. Bumper structure comprising a pair of impact bars of strap-like form disposed in vertical planes and in vertically spaced relation, and each having a deflected portion that is bent at substantially right angles to the plane of its bar, and a supporting arm disposed between and connected to said bent portions.

5. Bumper structure comprising an impact bar of strap-like form having a portion thereof deflected rearwardly and bent at substantially right angles to the plane of the bar and means for pivotally connecting a supporting arm to said bent portion.

6. Bumper structure comprising an impact bar of strap-like form disposed in a vertical plane, and having a portion deflected rearwardly and bent to a horizontal plane.

7. Bumper structure comprising an impact bar having an offset portion intermediate its ends, and means for connecting said portion to a supporting member.

8. Bumper structure comprising an impact bar having a projection extending rearwardly and approximately parallel to the main portion of the bar, and means for attaching the parallel portion of said projection to a supporting member.

9. Bumper structure comprising a pair of vertically-spaced impact bars each of which has a rearwardly offset portion intermediate its ends, means for connecting said portions to a supporting member, and means independent of said connecting means for securing said bars together.

10. Bumper structure comprising a pair of vertically-spaced impact bars each of which has a rearwardly offset portion intermediate its ends, means for connecting said portions to a supporting member, means independent of said connecting means for securing said bars together, and means for bridging said offset portions.

11. Bumper structure comprising vertically-spaced impact bars one of which has a rearwardly offset portion, means for securing said bars together to form a unitary structure, and means for connecting said offset portion to a supporting member.

12. Bumper structure comprising an impact bar having portions thereof deflected rearwardly at points intermediate its ends and the mid portion thereof, and a plate bridging the deflected portions and connected to said bar at its mid portion and adjacent to the ends thereof.

13. Bumper structure comprising a main bar having portions thereof deflected rearwardly intermediate its ends and mid portion, the mid portion of the bar being deflected vertically, but in substantially the vertical plane of the end portions thereof and a pair of vertically-spaced plates connected at their ends to the said bar and at their mid portions bearing against the said deflected portion and held in clamping engagement therewith.

14. Bumper structure comprising impact-receiving plates, a main bar connected thereto and having its end portions constituting extensions of the impact-receiving surface of the structure and having rearwardly extending portions adapted for connection to a supporting structure.

15. Bumper structure comprising impact-receiving plates, a main bar connected thereto and having its end portions constituting extensions of the impact-receiving surface of the structure and having rearwardly extending portions adapted for connection to a supporting structure, the mid portion of said main bar being deflected forwardly into abutting engagement with the rear surfaces of said impact-receiving plates.

In testimony whereof I, the said WILLIAM G. HARDY, have hereunto set my hand.

WILLIAM G. HARDY.